April 14, 1931.　　　　K. J. YOST　　　　1,801,184
HELICOPTER
Filed Nov. 25, 1929　　　4 Sheets-Sheet 1

WITNESS
O. W. Taylor

INVENTOR
Kenneth J. Yost,
BY Munn & Co
ATTORNEY

April 14, 1931.     K. J. YOST     1,801,184
HELICOPTER
Filed Nov. 25, 1929     4 Sheets-Sheet 4
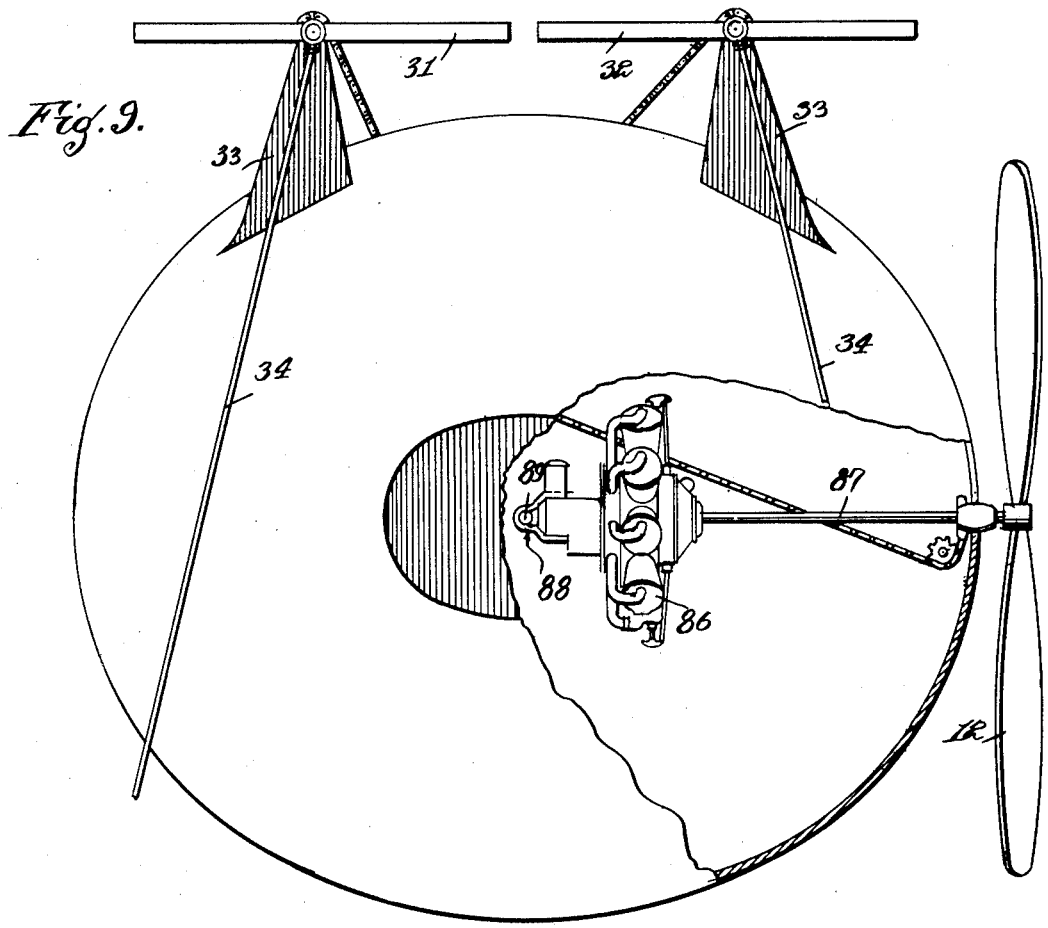
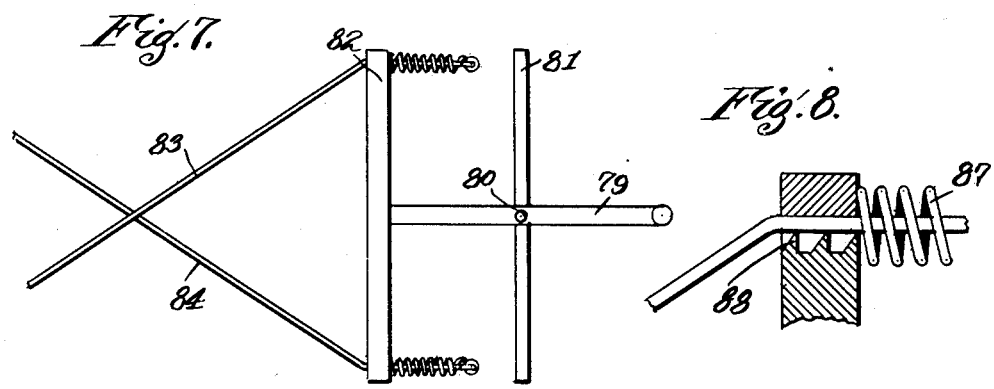
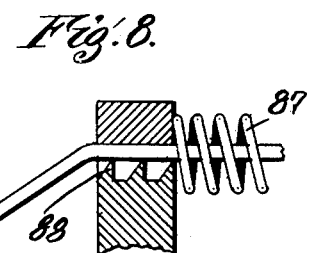
WITNESS
F.H. Taylor
INVENTOR
Kenneth J. Yost
BY
ATTORNEY Patented Apr. 14, 1931

1,801,184

UNITED STATES PATENT OFFICE

KENNETH J. YOST, OF CAMPBELLSTOWN, OHIO

HELICOPTER

Application filed November 25, 1929. Serial No. 409,708.

My invention relates to helicopters and more particularly to helicopters adapted for both vertical and horizontal flight, and it consists in the constructions, arrangements and combinations herein described and claimed.

It is well known that ordinary helicopters are well adapted for vertical flight but are unable to attain great speeds in horizontal flights. It is also common knowledge that airplanes can fly at relatively large speeds in a horizontal plane, but are poorly adapted for vertical flight necessary during the taking off and landing operations. It is, therefore, a primary purpose of my invention to provide a helicopter incorporating the efficient taking off and landing features of the ordinary helicopter as well as the features of an airplane necessary for the attainment of relatively large speeds during horizontal flight.

A further object of my invention is to provide a simple control means for adapting the helicopter to efficient propulsion in either a vertical or horizontal direction and for maneuvering the same during said movements.

A further object of my invention is to provide a helicopter of the type described which will offer a minimum of resistance to the wind stream.

A further object of my invention is to provide a helicopter whose center of gravity is so positioned in all directions of flight that stability and balance thereof are secured throughout all movements thereof.

A further object of my invention is to provide a device of the type described which has few parts, is of simple construction, and does not get out of order easily.

Other objects and advantages will appear as the specification proceeds, and the invention will be more particularly defined in the appended claims.

My device is illustrated in the accompanying drawings forming a part of this application, in which:—

Fig. 2 is a side elevational view of the device as shown in Fig. 1.

Figure 6:
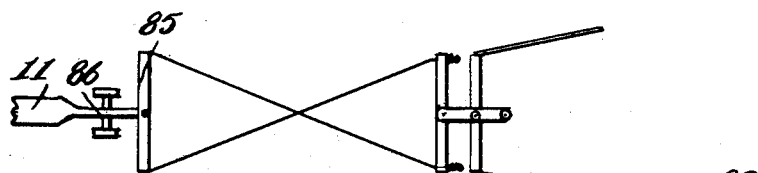

Figs. 6 to 8, inclusive, are detail views of portions of the device.

Fig. 9 is an elevational detail view of a modified form of the device with parts thereof broken away for clearness of illustration.

In carrying out my invention, I provide a hollow shaped body 1 consisting of the truncated elliptical cone-shaped parts 2 and 3 interconnected at their bases, as indicated at 4. The greater length or the major axes of these truncated elliptical cone-shaped members extend in a horizontal plane, as more clearly appears in Fig. 3.

Projecting downwardly from the lower portion of this body 1 is the landing gear, generally designated at 5, and comprising the downwardly projecting supports 6 interconnected by rods 7 and providing mounting means for axles 8 and 9 on which the wheels 10 of said landing gear rotate. Suitable springs, not shown, are positioned in the members 6 to absorb the shocks incident to landing. The members 6 and the axles 8 and 9 are sufficiently spaced to allow freedom of movement of a steering vane 11 therebetween, as appears from an examination of Fig. 1, and in a manner to be set forth hereinafter.

Figure 4:
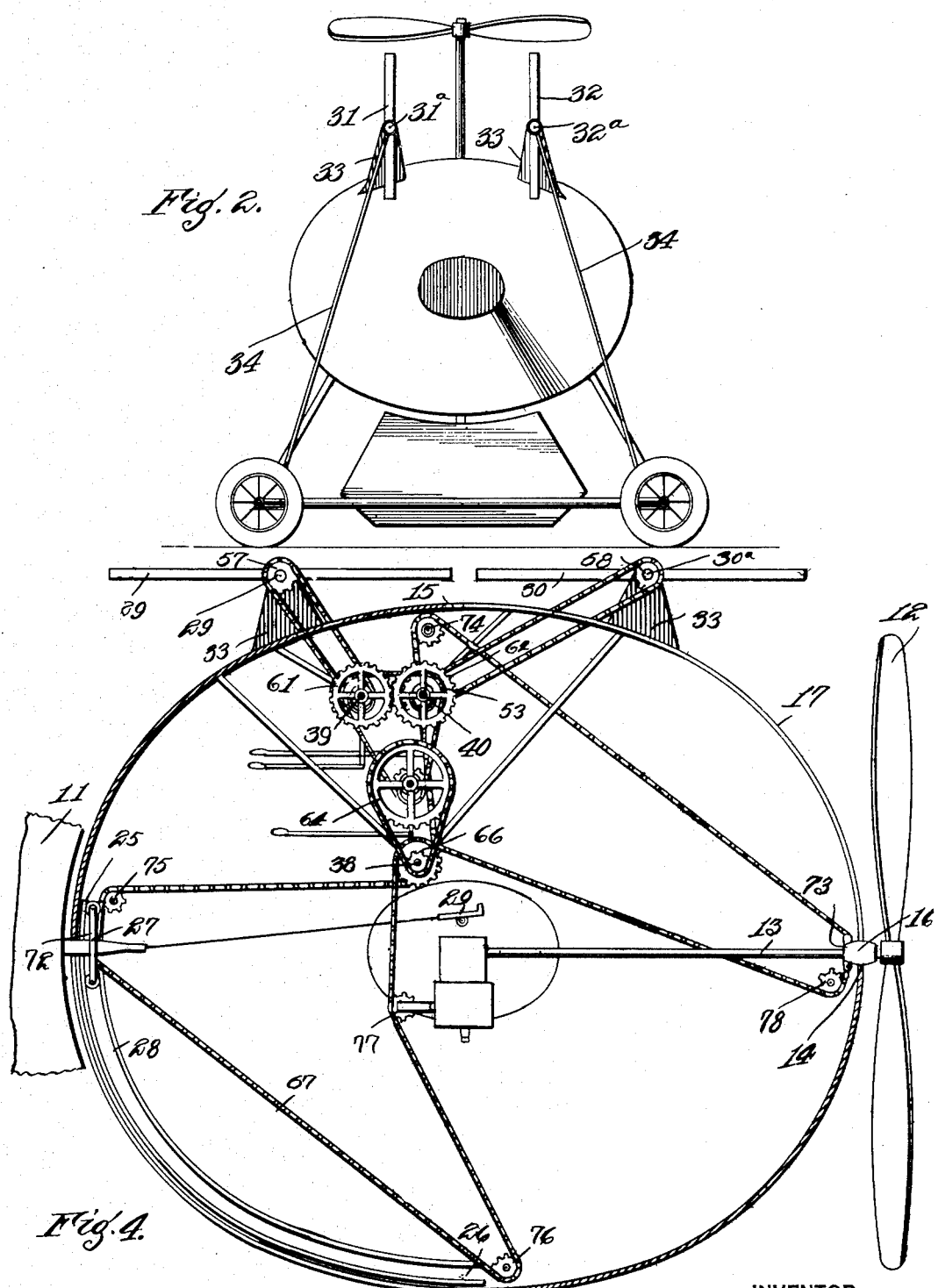
Fig. 4 is a sectional detail view with parts thereof being shown in elevation for clearness of illustration.

For propelling my helicopter in vertical as well as horizontal directions, I provide the propeller 12 keyed or otherwise suitably fixed with relation to a rotatable shaft 13. This shaft 13, as appears in Fig. 4, is adapted to be moved from a position 14 for horizontal flight to a position 15 for vertical flight, the bearing 16 mounted on said shaft 13 and the cooperating guide slot 17 in the body 1 permitting this movement.

Figure 5:
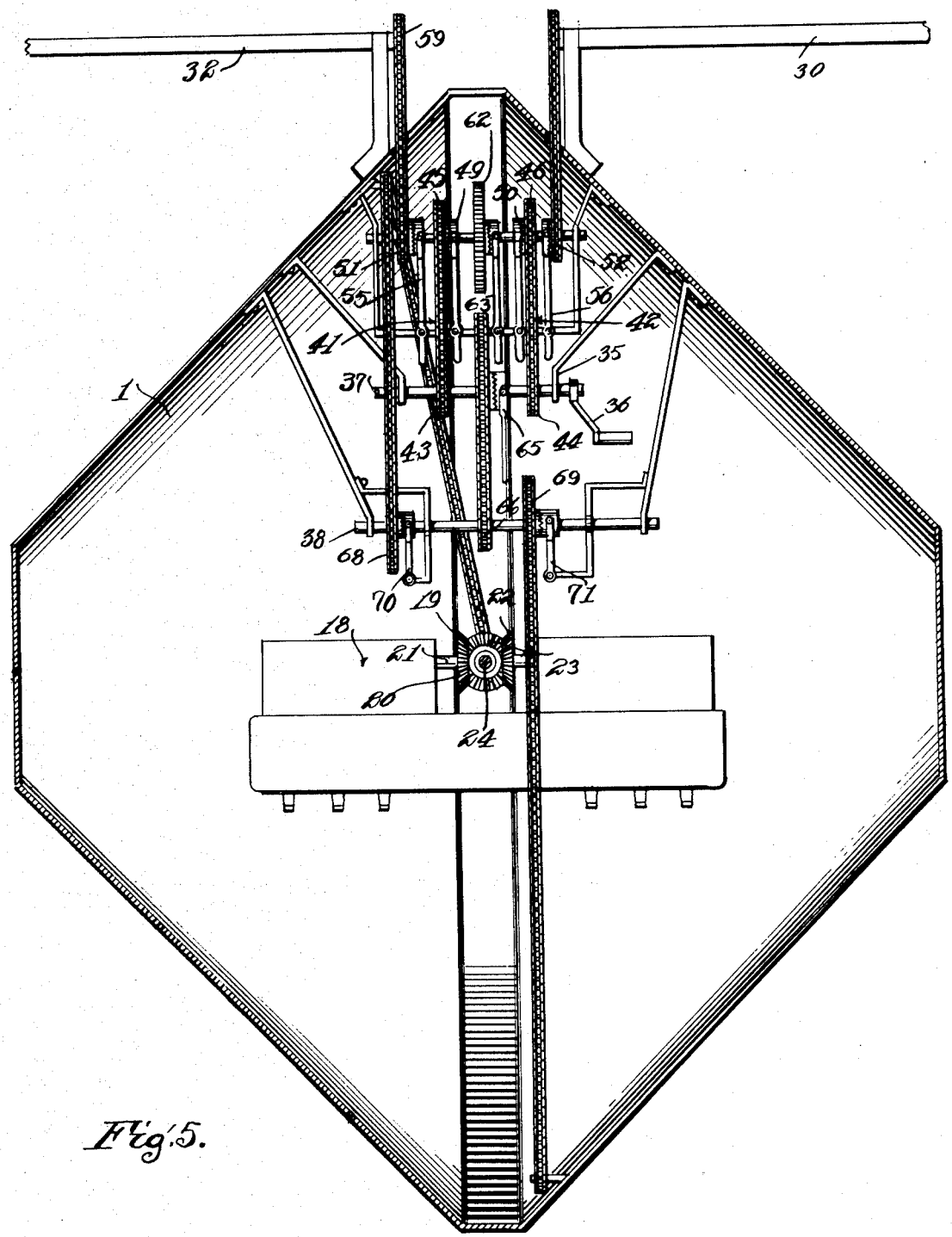
Fig. 5 is a further sectional detail view of a portion of the device with parts thereof being shown in elevation for clearness of illustration.

For rotating the shaft 13 to operate said propeller member 12, the motor 18 is provided. This motor 18 is secured to the frame of the body 1 by any suitable means, not shown, in a position in which the center of gravity of said motor coincides with the center of gravity of said body 1. By this arrangement, a balanced craft is obtained. This motor is of the usual "in line" construction except for the fact that the drive is taken from the center of the crank shaft rather than the end and the motor is inverted, as appears in Fig. 5.

Connecting the propulsion shaft 13 to the motor 18 for rotation thereby while at the same time permitting movement of said shaft 13 between the operative positions 14 and 15, the gearing, generally designated at 19, is provided. This consists of a bevel gear 20 splined or otherwise suitably fixed to the crank shaft 21 of motor 18, a bevel gear 22 loosely mounted on the crank shaft 21 and oppositely disposed relatively to the bevel gear 20, and another bevel gear 23 fixed to the propulsion shaft 13. The crank shaft 21 is thus adapted to drive the propulsion shaft 13 by means of cooperating gears 20 and 23, while the gear 22 maintains said gears in meshed relation. This system of gearing permits arcuate movement of the propulsion shaft 13 about the point 24 substantially at the center of the body of the plane, while at the same time allowing said shaft 13 to be rotated about its axis, as can easily be understood.

For steering the helicopter both in vertical and horizontal flight, the steering vane 11 is provided. As appears in Fig. 4, this steering vane is adapted for actuation from two operative positions 25 and 26, the car 27 on which said vane is mounted and the cooperating track 28 in the body of the helicopter permitting this positioning of the steering apparatus. Suitable means, generally indicated at 29, is provided for deflecting the vane to the right and left for performing the steering operation. As will be described later, the steering vane 11 is adapted for simultaneous movement with the propulsion shaft 13 from the position adapted for horizontal flight to that provided for vertical flight.

Figure 1:
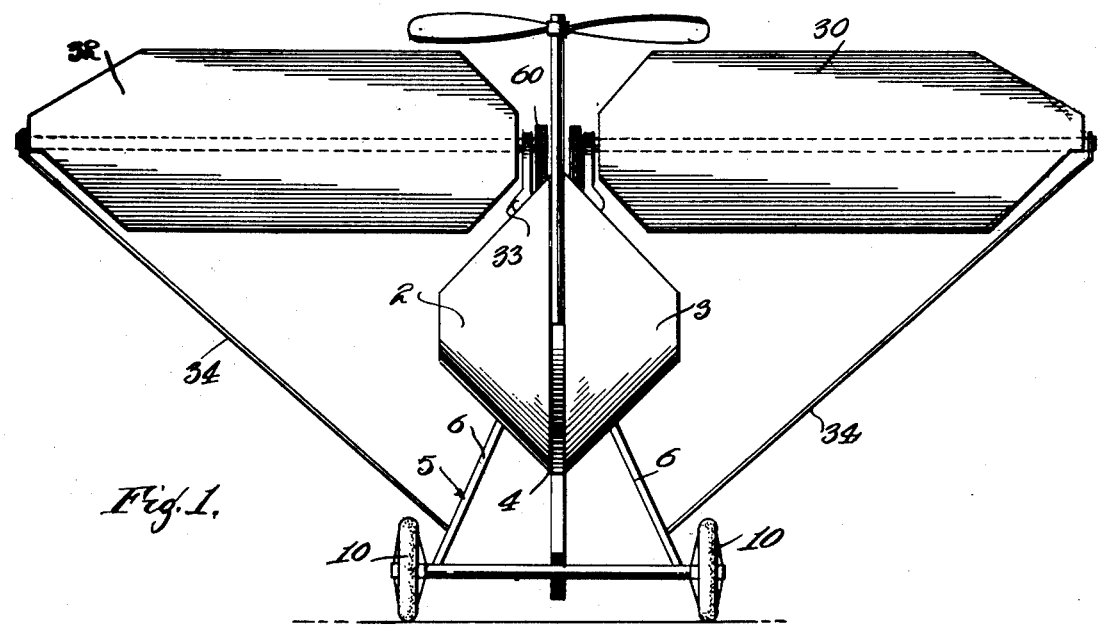
Figure 1 is a front elevational view of my device in one operative position.

For sustaining the helicopter in horizontal flight, the wing members 29, 30, 31 and 32 are provided. These wings are supported for rotation about their lateral center by any suitable means such as the shafts 29ª, 30ª, 31ª and 32ª which may be suitably journaled in bearing supports 33 on the top of the helicopter. For supporting these bearing supports the rods or wire struts 34 connected to the landing gear 5 are provided. These wings are positioned in pairs on opposite sides of the helicopter. As is shown in Fig. 1 they are suitably tapered at their ends to provide clearance with respect to the supports 34 and the body 1 during rotation.

To adapt the helicopter for flight in a vertical, horizontal plane, and to maneuver the same during flight, the control mechanism, generally indicated at 35, is provided. This control mechanism comprises a rotatable crank 36 which, in conjunction with other mechanism to be described, is adapted to simultaneously as well as individually position the rotatable wings, the propulsion shaft and the steering vane 11, in the various operative positions. The mechanism to accomplish this purpose comprises the rotatable shaft 37, the rotatable shaft 38, and the shafts 39 and 40. For rotating the shafts 39 and 40 to actuate the wings to the various operative positions, gear means 41 and 42 of any suitable construction, but preferably comprising sprockets 43 and 44 positioned on the shaft 37, sprockets 45 and 46 positioned on the shaft 40, and similar sprockets on the shaft 39, are provided. Suitable clutch means, shown at 49 and 50, are provided for control of the sprockets 45 and 46. Rotatable with the shafts 39 and 40 are the sprocket members 51 and 52 on shaft 40 and similar sprocket members on shaft 39. Suitable clutch means 55 and 56 of any usual construction control these sprockets. These sprockets are geared to the wings by means of sprocket members 57, 58, 59 and 60 integral with the shafts mounting said wings and interengaging chains engaging said sprockets. The shaft members 39 and 40 are geared together by the intermeshing equally sized gears 61 and 62 mounted on said shafts respectively. A conventional form of clutch 63 controls the rotatable connection of one of said gears with its respective shaft.

For simultaneously controlling the steering and propulsion means with said wings or for individually controlling said wings or steering and propulsion means, the rotatable shaft 38 is geared by any suitable means to manually operable shaft 37. In this embodiment, I have shown the gear 64 mounted on the manually operable shaft 37 and controlled by a clutch 65, and a sprocket gear 66 fixed for rotation with shaft 38 and connected to the gear 64 by a chain. To actuate the propulsion means and the steering means to the various operative positions from the rotatable shaft 38 an elongated endless chain 67 is provided engageable about sprockets 68 and 69 mounted for rotation with said shaft 38 and controlled by suitable clutches 70 and 71. This endless chain comprises throughout its length connections 72 and 73 to the steering apparatus and propulsion mechanism respectively. As shown in Fig. 4, said chain extends from said connection 73 to the propulsion means, about the idler sprocket 74 placed adjacent the operative position 15 of said propulsion means, about the sprocket 68 on shaft 38 and about idler sprocket gear 75, placed adjacent operative position 25 of the steering apparatus. The chain is then connected to the steering apparatus, as at 72. It then engages about idler sprocket gear 76, adjacent operative position 26 of the steering vane, over idler sprocket gear 77 and about sprocket gear 69 and idler 78 placed adjacent operative position 14 of the propulsion means. The chain is then connected as shown at 73 to the propulsion shaft 13.

The apparatus for deflecting the vane 11 for steering purposes in all operative positions comprises the hand lever 79 pivoted for lateral movement at 80 on the swivelly mounted shaft 81 positioned at the substantial center of the helicopter. This lever 79 is integral with the laterally extending beam 82, at the ends of which are secured the flexible connecting means 83 and 84, crossed and engaging the oppositely disposed ends of a second laterally extending beam 85 integral with said vane 11, which is pivotally mounted as shown at 86 on car 27.

Suitable springs 87 provide a means for taking up slack in the flexible members 83 and 84. Also cooperative with these flexible members 83 and 84 are cleats 88 mounted in the beam 82. These cleats grip the flexible members 83 and 84 during the lateral steering operation, and release said flexible members 83 and 84 during the positioning operations in a manner easily understood.

From the foregoing description, the operation of my device is easily seen. When it is desired to "take off", the operator places the propulsion means, the steering means and the wings in the position shown in Figs. 1 and 2. This is readily accomplished by rotating the handle 36 in the proper direction with all the clutches closed with the exception of clutch 63 controlling the inter-geared connection of shafts 39 and 40.

Figure 3:
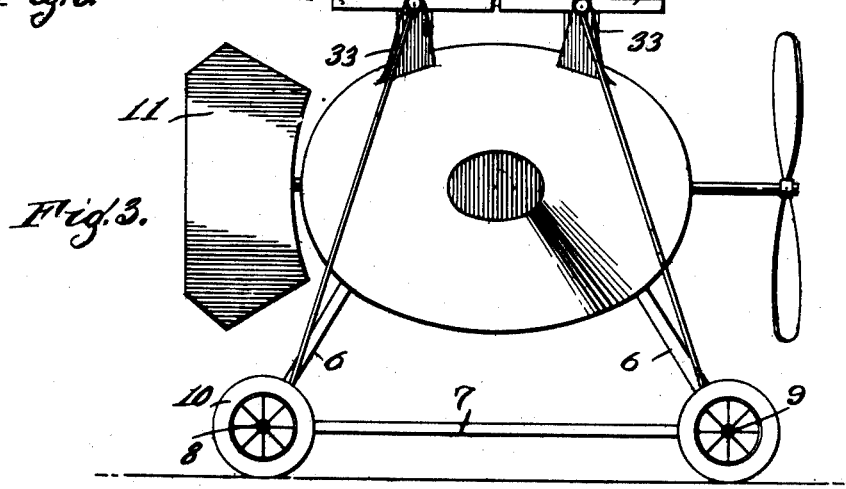
Fig. 3 is a side elevational view of the device in another operative position.

When the helicopter is launched in flight at a sufficiently high elevation and it is desired to undertake horizontal flight, the propulsion means, steering means and the wings are moved to the position shown in Figs. 3 and 4 by rotating the handle 36 in a direction opposite to that of the previous operation with the clutches positioned as before.

When it is desired to descend and land, the clutch 63 is closed and the sprockets 45 and 46 released by means of the clutch means controlling the same. The handle 36 is then rotated in the proper direction. This operation rotates the wings in directions opposite to one another, thereby positioning them at an angle relative to one another and in spaced relation for the passage of air therebetween in a manner somewhat similar to the passage of air from the opening in a parachute. The wings when in this position perform a braking function, thereby decreasing the rate of the descent. The speed of the motor is, of course, controlled simultaneously with the foregoing operations to permit descent at any desired speed.

When it is desired to turn the helicopter by "banking," etc., the right pair of wings or the left pair may be rotated to the desired positions independently of the opposite pair of wings. This is accomplished by closing the clutches controlling either the sprockets 51 and 53 or 52 and 54, as desired. These sprockets control wings 31 and 32 and 29 and 30, respectively. The sprocket 63 controlling the inter-geared connection between the shafts 39 and 40 is also released during this operation. Since it may not be desired to actuate the propulsion and steering apparatus during this steering movement, the clutch 65 provides a suitable control for releasing said apparatus from movement by shaft 37 during the above operation. In a similar manner, the pair of forward wings may be actuated independently of the pair of rear wings, or any of the wings may be actuated independently of the others by the clutch means shown. Suitable brake means, not shown, may be provided to cooperate with said clutch means for preventing movement of the elements released by said clutch means.

The hand lever 79 permits easy lateral steering during flight by providing means for the deflection of the vane 11. This lever 79 is actuated in a manner similar to the rudder of a boat. Its pivotal mounting 81 accommodates it to perform the steering function in various operative positions.

In that form of the invention shown in Fig. 9, the radial motor 86 is shown in place of the "in line" motor of Fig. 4. The propulsion shaft 87 in this form of the invention is made integral with the crank shaft of the motor. To allow the propulsion shaft 87 to be swung to the various operative positions, the motor 86 is pivotally mounted, as shown at 88, on shaft 89 supported by the frame of the helicopter. As appears in said Fig. 9, this shaft 89 is located at the substantial center of the helicopter, the position being calculated to properly balance the craft when the motor is displaced to the different operative positions. The remaining parts of this form of the invention are exactly similar to those of the preceding form.

The operation of this form of the device is the same as that of the former modification and need not be further described.

It is thus seen that I have provided a helicopter which is readily adaptable during flight to the most efficient form known for vertical flight as well as the most efficient form known for horizontal flight, with means for easily controlling the same, that the body 1, due to its particular shape is well adapted to offer a minimum resistance to the wind stream in both vertical and horizontal flight;

and that due to the relative positioning of the parts, the craft will be well balanced throughout the various operative positions.

I claim:—

1. In a helicopter, a body portion, rotatable sustaining plane members mounted on said body portion, vertically extending arcuate slots in the front and rear of said body portion, a rotatable propulsion member mounted in the substantial center of said body portion and projecting through said front slot, a steering member projecting through said rear slot, and means for simultaneously and independently rotating said plane members and positioning said propulsion member and said steering member in their respective slots.

2. In a helicopter, a body portion, a plurality of sustaining plane members projecting from each side of said body portion, vertically extending slots in the front and rear parts of said body portion, a propulsion shaft member mounted at the center of said body portion and projecting through said forward slot, means positioned at the center of said body portion for rotating said propulsion shaft member, a steering vane member slidably mounted in said rear slot, and means for actuating said members to horizontal position relative to said body portion, and for moving said members to a vertical position relative to said body portion for vertical flight.

3. In a helicopter, a body portion, a pair of rotatable wings projecting from each side of said body portion, means for rotating said members in the same direction for positioning the same for horizontal and upward vertical flight, means for rotating said planes in opposite directions for slowing the rate of downward vertical flight, said means comprising a manually rotatable shaft, a pair of inter-geared shafts individually geared to said first-named shaft and to said rotatable planes, and clutch means for controlling the geared connections between said shafts.

4. In a helicopter, a body portion, vertically extending arcuate guide slots in the front and rear of said body portion, a propulsion member mounted at the substantial center of said body portion and projecting through said guide slot, a steering member mounted in said rear slot for sliding movement relative thereto, means for variably positioning said members relative to said guide slots comprising an endless chain member connected to said propulsion and steering member, and means for moving said endless chain member.

5. In a helicopter, a body portion, vertically extending arcuate guide slots in the front and rear of said body portion, a propulsion member mounted at the substantial center of said body portion and projecting through said guide slot, a steering member mounted in said rear slot for sliding movement therein, means for variably positioning said members relative to said guide slots comprising an endless chain member connected to said propulsion and steering member, means for moving said endless chain member comprising a rotatable shaft, a pair of chain sprockets rotatable with said shaft and engageable with said chains, a manually rotatable shaft geared to said first-named shaft, and clutch means for controlling said gearing.

6. In a helicopter, a body portion, a vertically extending arcuate slot in the front of said body portion, a rotatable propulsion shaft positioned at the substantial center of said body portion and projecting through said slot portion, a motor for driving said rotatable shaft, and means for connecting said motor to said drive shaft comprising a pair of oppositely disposed bevel gears positioned at the substantial center of the crank shaft of said engine, a bevel gear fixed to the end of said rotatable shaft cooperating with said first-named bevel gears, one of said first-named bevel gears being freely rotatable relative to its crank shaft, whereby said rotatable shaft is adapted for rotation about its axis in any position in said slot.

7. In a helicopter, a body portion, a vertically extending arcuate slot in the rear part of said body portion, a steering vane slidably positioned in said slot, and means for deflecting said steering vane while in any position in said slot.

8. In a helicopter, a body portion, a vertically extending arcuate slot in the rear part of said body portion, a steering vane slidably positioned in said slot, means for deflecting said steering vane while in any position in said slot, comprising laterally projecting arms positioned on said vane member, a pivot for supporting said vane member, a manually operable lever pivotally mounted at the substantial center of said body portion, laterally projecting arms on said manually operable lever, and flexible means interconnecting said laterally projecting arms.

9. In a helicopter, a body portion, a vertically extending arcuate slot in the rear part of said body portion, a steering vane slidably positioned in said slot, means for deflecting said steering vane while in any position in said slot comprising laterally projecting arms positioned on said vane member, a pivot for supporting said vane member, a manually operable lever pivotally mounted at the substantial center of said body portion, laterally projecting arms on said manually operable lever, flexible means interconnecting said laterally projecting arms, and resilient means for taking up slack in said flexible members during movement of said vane in said slot, and means for releasing said means for taking up slack during the deflecting movement of said vane.

10. A helicopter having a body portion comprising two laterally extending sections of truncated elliptical cone shape interconnected at their bases.

11. In a helicopter, a body portion having a slot, a control vane projecting from said slot and adapted for variable positioning in said slot for the control of said helicopter and means for deflecting said vane in any of its variable positions for further controlling said helicopter.

12. In a helicopter, a body portion having a slot, tracks positioned in said slot, a car running on said tracks and a controlling vane mounted on said car and projecting from said slot for controlling said helicopter.

13. In a helicopter, a body portion having a slot, a control vane projecting through said slot, means for positioning said control vane in variable positions relative to said slot for the controlling of said helicopter and means for deflecting said vane for further controlling said helicopter comprising a pivotal mounting for said vane and manual means for swinging said vane about said mounting.

14. In a helicopter, supporting wing members, a steering member and a propulsion member, adapted to be positioned for vertical as well as horizontal flight, and means for simultaneously as well as individually positioning said members for assuming the various positions of flight, comprising a rotatable shaft adapted for manual actuation, a system of gears interconnecting said rotatable shaft and each of said members and clutches positioned in said systems of gearing for controlling the operation and inoperation of said members, as desired.

KENNETH J. YOST.